United States Patent

[11] 3,612,435

| [72] | Inventor | Robert J. Roman<br>Rochester, N.Y. |
| --- | --- | --- |
| [21] | Appl. No. | 852,406 |
| [22] | Filed | Aug. 22, 1969 |
| [45] | Patented | Oct. 12, 1971 |
| [73] | Assignee | Eastman Kodak Company<br>Rochester, N.Y. |

[54] SAFETY DEVICE FOR A MOTION-PICTURE PROJECTOR HAVING AN ENCLOSED TAKEUP MECHANISM
6 Claims, 5 Drawing Figs.

[52] U.S. Cl..................................................... 242/205,
242/76, 352/158
[51] Int. Cl..................................................... B11b 15/32,
G03b 1/04
[50] Field of Search.....................................242/205–210,
76, 71; 352/157, 158; 226/91, 62

[56] References Cited
UNITED STATES PATENTS
| 1,711,977 | 5/1929 | Underwood.................. | 226/91 |
| --- | --- | --- | --- |
| 2,051,790 | 8/1936 | Foster et al................... | 242/208 |

*Primary Examiner*—Leonard D. Christian
*Attorneys*—Robert W. Hampton and G. Herman Childress

ABSTRACT: A motion-picture projector having an enclosed takeup mechanism is provided with a safety device which avoids film damage and alerts the projector operator if the takeup mechanism malfunctions. A film guiding passageway leading to the film takeup mechanism is provided with an aperture through which film may escape to the exterior of the projector housing when the film is caused to buckle in a takeup malfunction.

ROBERT J. ROMAN
INVENTOR

ROBERT J. ROMAN
INVENTOR

SAFETY DEVICE FOR A MOTION-PICTURE PROJECTOR HAVING AN ENCLOSED TAKEUP MECHANISM

CROSS-REFERENCES TO RELATED APPLICATIONS

Reference is made to the following commonly assigned copending U.S. Pat. application Ser. No. 798,070, filed Feb. 10, 1969 in the name of Joseph J. Crispino, entitled TAKEUP MECHANISM: (now abandoned).

BACKGROUND OF THE INVENTION

1. Field of the Invention

This invention relates to improvements in self-threading motion-picture projectors having totally or substantially enclosed film takeup mechanisms. More particularly, this invention relates to a safety device for such projector which alerts the projector operator to malfunctions in the film takeup mechanism whereby film damage which might result from such malfunctions may be avoided.

2. Description of the Prior Art

The commonly assigned copending application of Joseph J. Crispino, Ser. No. 798,070, filed Feb. 10, 1969, discloses a cartridge-loading motion-picture projector of the self-threading type wherein the leading end of the film strip is automatically delivered to and attached to the core of a takeup reel. The takeup reel of this projector, as well as the entire path along which the film is guided from the film cartridge to the takeup reel, is entirely encased by the projector housing. Thus, at no point along the path of film travel can the movement of film be observed by the projector operator.

In such motion-picture projectors, or projectors wherein the film path and the takeup reel are substantially enclosed by the projector housing, a failure of the film takeup mechanism (e.g., breaking of a drive belt) or blockage in the film path leading to the takeup chamber can result in undesirable accordionlike pleating of the film that may destroy the film. Upon failure of the takeup mechanism to receive or store film at the same rate that the film is advanced through the projector, the film is forced to buckle and subsequently pleat either in the takeup chamber or in the closed passageway leading thereto, by the action of the film-advancing pulldown claw. Moreover, such a result probably will go unnoticed until there is sufficient back pressure on the film to cause a distortion in the projected image of the film, or until an uncommon noise or chatter is produced. Unfortunately, a sufficient back pressure to cause a distorted image does not usually occur nor is an uncommon noise of this type generated, until a significant portion of the film has buckled and probably ruined.

U.S. Pat. No. 1,711,977 issued May 7, 1929 to E. E. Underwood discloses a projector having an aperture through which a film loop can project if a film break occurs above the film gate. However, a break of this nature would be readily apparent to the operator of a projector because the film is ordinarily visible in this area of the film path, and also any one viewing the film would quickly know that film was not being properly projected. Thus, the problem to which the Underwood patent relates is substantially different from the problem existing with the projector of the type herein disclosed wherein the projector has a completely enclosed takeup mechanism and the film path from the pulldown claw to the takeup mechanism is also completely enclosed. In such a projector failures below the film gate are not visible and are not apparent from viewing the film images projected on a screen.

SUMMARY OF THE INVENTION

Accordingly, it is an important object of this invention to provide a safety device for use in motion-picture projectors having enclosed film takeup mechanisms whereby film damage normally resulting from a malfunction of such takeup mechanisms may be avoided.

It is a further object of the invention to provide an uncomplicated safety device for use in such projectors whereby the projector operator is immediately alerted when a malfunction of the takeup mechanism occurs.

In accordance with a preferred embodiment of the invention a normally substantially enclosed film guiding passageway leading from the projection gate of a motion-picture projector to its takeup reel is provided with an aperture through which film may escape from the passageway in the event of a malfunction in the film takeup mechanism. The escape aperture is located in a portion of the film passageway at which the film is first likely to buckle from the back pressure produced by a malfunctioning takeup mechanism. Moreover, the aperture is located so as to communicate with the exterior of the projector housing. Thus, when a malfunction in the film takeup occurs, the back pressure in the film produced thereby will cause the film to buckle or bulge and protrude from the escape aperture to form a loop of a progressively increasing size. This loop will continue to accept film from the film-advancing mechanism, thereby avoiding film damage until the projector operator, having been alerted by the presence of such loop, takes corrective measures to rectify the malfunction or stops the projector.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawing, in which.

DESCRIPTION OF THE PREFERRED EMBODIMENTS

Because photographic projectors are well known, the present description will be directed in particular to elements forming part of, or cooperating more directly with, the present invention, projector elements not specifically shown or described herein being understood to be selectable from those known in the art.

Figure 1:
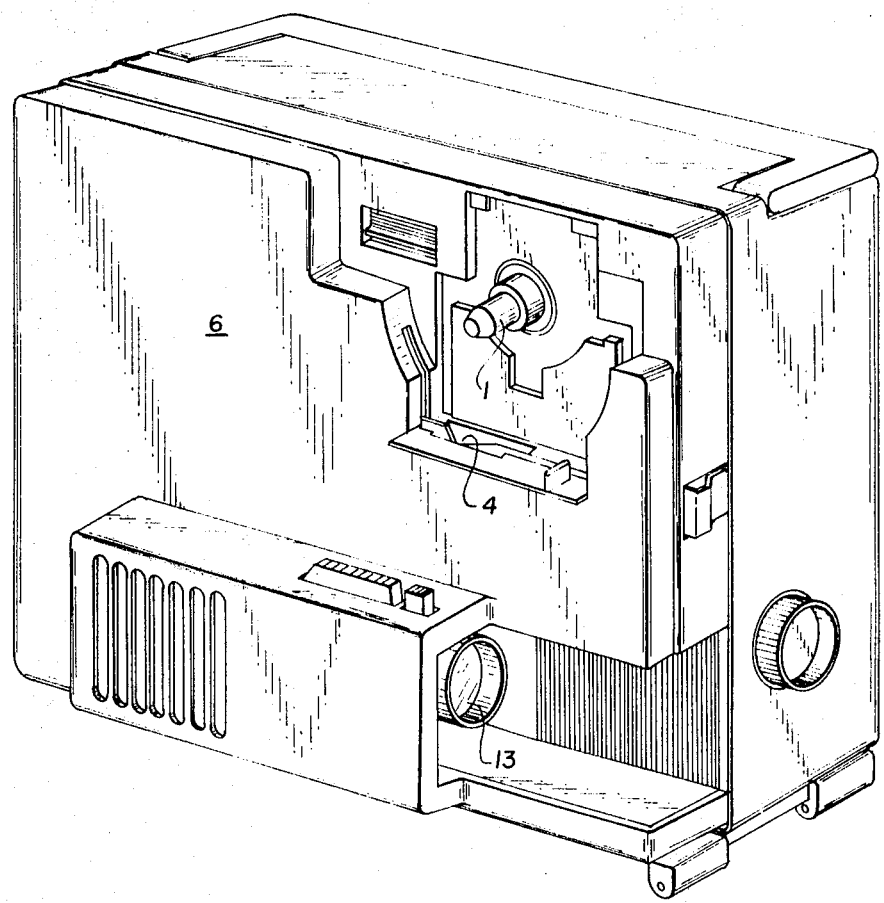
FIG. 1 is a perspective view of a motion-picture projector incorporating a safety device of the present invention.
Figure 2:
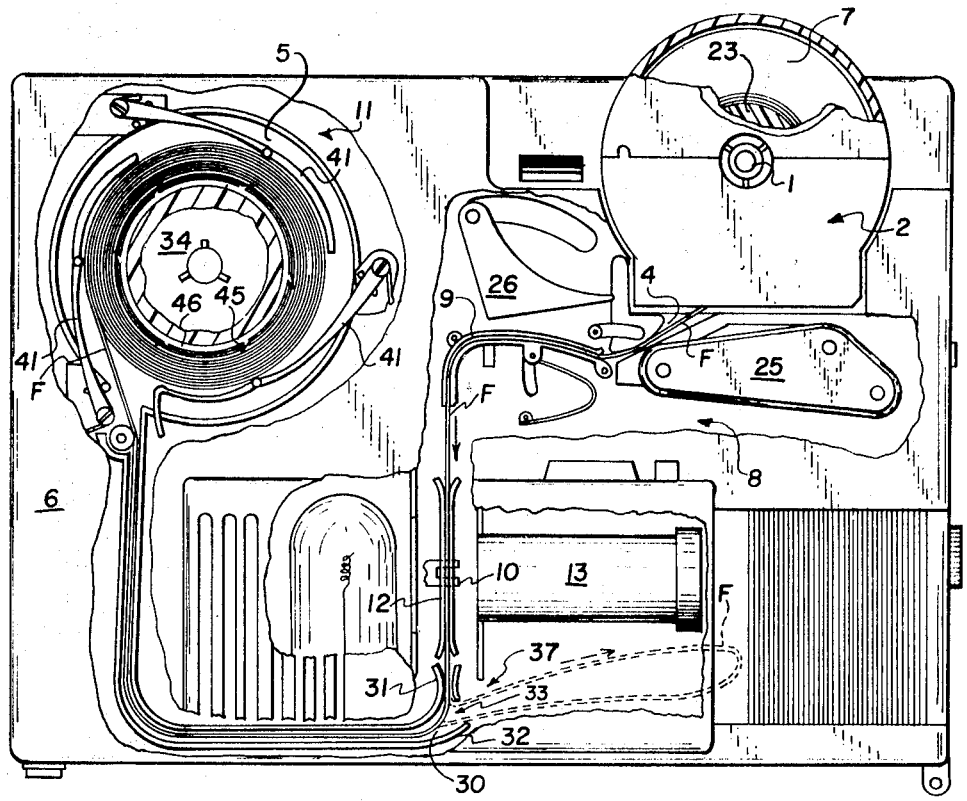
FIG. 2 is a front elevational view of the projector depicted in FIG. 1 with portions of the projector housing being cut away.

Referring now to FIGS. 1 and 2 of the drawings, a motion-picture projector of the present invention comprises a spindle 1 and an orienting structure (not shown) for receiving and supporting a film cartridge 2 in a predetermined orientation. The cartridge has a mouth at its bottom (as viewed in the drawings) that is in alignment with a film entrance aperture or guide slot 4 of the projector. As described more fully hereinafter, threading means are provided within the projector housing 6 for automatically removing film from cartridge 2, feeding the film through slot 4 and along a predetermined path to a projection gate, where the film is momentarily stopped for projection through lens 13, and then into a takeup chamber wherein the film is wound on a takeup reel 5. As illustrated, the entire threading path, from entrance aperture 4 to (and including) the takeup reel 5 is encased by the projector housing 6 and thereby concealed from view by the projector operator. Thus, as may be appreciated, should there be a malfunction or failure of the film takeup reel to wind up film as the film enters the takeup chamber subsequent to projection, or if other failure occurs in the enclosed portion of the film path, such malfunction or failure is likely to go unnoticed for a considerably period of time, during which time serious damage to the film occurs.

Referring now to FIG. 2, a projector according to the present invention comprises a stripping mechanism generally designated 8 which comprises a driving belt 25 and a stripping finger 26 that are adapted to enter the cartridge mouth and to withdraw the leading end of film F wound on core 23 of a supply reel 7. Upon entering the cartridge, belt 25 engages the film on the reel and rotates the reel in a direction to unwind film therefrom, while finger 26 picks up the leading end of the film from the reel and cooperates with the belt to guide the film from the cartridge and into a film guide 9. Stripping mechanism 8 continues to remove film from the cartridge and to direct the film into guide member 9 until a pulldown claw 10, located adjacent a projection gate 12, becomes effective to engage the film and to further feed the film through the projector along a narrow, substantially closed passageway defined by film guide 30, toward a duo-flanged reel 5 in a takeup chamber 11. When the film starts driving the film, the stripping mechanism 8 is withdrawn from the cartridge.

Upon reaching the takeup chamber, the film is guided toward a hub 34 of takeup reel 5 by a plurality of elongated fingers 41 which are pivotally mounted to the projector housing 6 in an overlapping spiral relationship. The specific takeup mechanism disclosed in FIG. 2 is more particularly described in the aforementioned copending application Ser. No. 798,070. Film directed to hub 34 is engaged by teeth 45 extending from a slip clutch 46, as described more fully in U.S. Pat. No. 3,298,625, issued Jan. 17, 1967 to Babcock. The film is pulled around the hub 34 by teeth 45 and is cinched thereon as takeup reel 5 continues to rotate and wind successive convolutions of film onto the hub. Takeup reel 5 is rotated at a rate which normally prevents any undesirable slack in the film strip. Upon completion of the forward projection cycle, the film may be automatically rewound from the takeup reel 5 back into the supply cartridge 2 by an automatic rewind mechanism such as the mechanism disclosed in U.S. Pat. No. 3,552,683.

Figure 3:
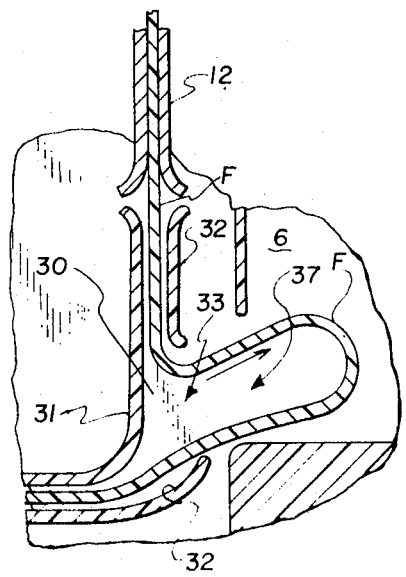
FIG. 3 is an enlarged fragmentary view of a portion of the projector of FIG. 2.

Now referring to FIGS. 2 and 3 film guide 30, through which film is guided to the takeup chamber, comprises inner and outer guide members 31 and 32, respectively, arranged in substantially parallel relationship to define a narrow passageway. Film guide 30 is generally U-shaped, having a pair of 90° bends or turns formed therein. At a location on the upstream side of each of these turns (i.e. the side from which film is advanced by the claw 10) and in close proximity to the turns, the film has an initial tendency to buckle if the film is not taken up as fast as it is advanced toward the takeup chamber by pulldown claw 10. When a takeup malfunction occurs the film in the area of these bends exerts a force against the inner surface of outer guide member 32 near the turns in the film guide. In accordance with the embodiment of the invention shown in FIGS. 2 and 3, outer guide member 32 is provided with a suitable discontinuity or aperture 33 through which film may escape the confines of film guide 30 when the film cannot pass through film guide 30 in the normal manner. Aperture 33 is preferably positioned at the bend in outer guide member 32 nearest the claw where the force exerted by the claw is greatest. Aperture 33 permits the film to escape before serious film damage occurs. Factor considered in determining the size of aperture 33 includes the stiffness of film F and the force exerted on the film if a takeup malfunction occurs.

Located in close proximity and in alignment with aperture 33 is an aperture 37 in housing 6. Film escaping guide 30 may be discharged to the exterior of the projector housing through aperture 37 thereby signaling the projector operator of the malfunction. As shown in phantom lines in FIG. 2, the film passes through both apertures 33 and 37 in the form of a loop of progressively increasing size which quickly will become apparent to the projector operator when the loop is long enough to extend beyond the forward most portion of the projector housing which protects projection lens 13.

As noted from FIG. 3, the aperture 33 may be formed so that the portion of guide member 32 at the bottom side of the opening is offset further away from guide member 31 (i.e. to the right) than is the corresponding portion at guide member 32 at the top of the aperture. With the construction shown it has been found that the back force or pressure (i.e., the pressure acting in the guide 30 in a direction from left to right as viewed in FIG. 3) which is required to cause the film to buckle and exit through aperture 33 is a function of the thickness and stiffness of the film, the dimensions of the offset between the portions of guide member 32 at the top and bottom of aperture 33, and the dimension or width of the aperture from top to bottom. These factors can be varied so that the pressure of the film in the guide is normally within the range of pressures between the valve where film buckles and escapes through aperture 33 and the valve of the forces normally encountered during a film threading cycle of operation.

Figure 4:
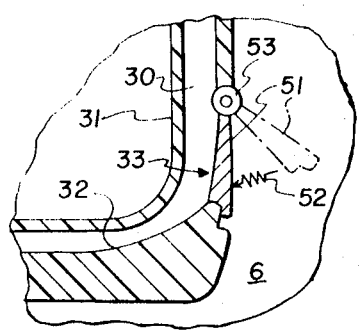
FIGS. 4 and 5 are fragmentary views of the portion of the film passageway of the projector depicted in FIG. 2 showing alternate embodiments of the invention.

Another embodiment of the invention is illustrated in FIG. 4 and is similar in many respects to the previously described embodiment. As illustrated in FIG. 4, the outer guide member 32 may be formed as an integral part of projector housing 6. The aperture 33 through which film can escape from guide 30 is normally closed by a door 51 that is connected to the projector by a hinge 53 at the upper edge of the door. A spring diagrammatically indicated at 52 may be provided for holding the door in its closed position as illustrated in solid lines, thereby preventing entrance of foreign matter into the film passageway and enhancing the appearance of the exterior of the projector. When door 51 is hinged at the top as shown in FIG. 4, the force of gravity may be adequate to maintain the door in its normally closed position. The door remains closed until the force exerted by the film against the door is sufficient to overcome the biasing force of spring 52 (and/or of gravity). When this force is exceeded, the door is forced open by the film and the film is allowed to escape from guide 30 in the manner previously described.

Figure 5:
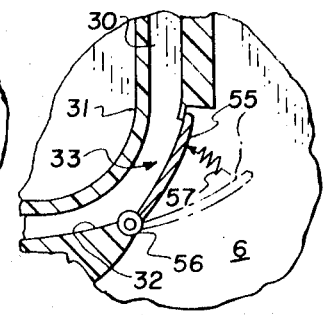

A further embodiment of the invention is illustrated in FIG. 5 of the drawings. This embodiment is substantially the same as the embodiment shown in FIG. 4 except that the door 55 is connected to housing 6 by a hinge 56 at the lower edge of the door. The door is normally held in its closed position by a spring 57, and may be forced to its open position as shown in dotted lines against the biasing force of the spring in the manner previously described in connection with FIG. 4. This arrangement of the door is advantageous because the force of spring 57 may be only enough to hold the door closed. Thus a very minimum amount of force is required to be exerted by the film for opening the door. In other words, the force exerted by the film need not be enough to lift the door.

The invention has been described in detail with particular reference to preferred embodiments thereof, but it will be understood that variations and modifications can be effected within the spirit and scope of the invention.

I claim:

1. A machine for handling a roll of strip material, said machine comprising:
   a, a housing;
   b. means for supporting a roll of strip material relative to said housing;
   c. a takeup mechanism supported by said housing for receiving and storing strip material;
   d, means substantially enclosing said mechanism;
   e, means carried by said housing for transporting said strip material from said supporting means to said mechanism;
   a housing; defining a substantially enclosed passage between said transporting means and said mechanism through which said strip material may be advanced from said transporting means to said mechanism; and
   g, means defining an aperture in said passage whereby strip material may be driven by said transporting means to the exterior of said passage through said aperture in the event of a malfunction of said mechanism or blockage in said passage between said aperture and said mechanism.

2. A machine as set forth in claim 1 wherein said passage has a bend therein, and said aperture is positioned in close proximity to said bend and between said bend and said transporting means where said material is most likely to buckle in the event of a malfunction of said takeup mechanism or blockage in said passage between said aperture and said mechanism.

3. In a motion-picture projector having a projection station, means defining a substantially enclosed film takeup chamber, a substantially enclosed guiding channel for film between said projection station and said takeup chamber, means for advancing a strip of film from said projection station to said takeup chamber through said channel, and means located within said enclosed takeup chamber for receiving and winding a film strip advanced thereto by said film advancing means, the improvement comprising:

means defining an aperture in said channel through which said film strip may be driven by said advancing means in the event of a malfunction of said receiving and winding means or blockage in said passage between said aperture and said chamber.

4. A machine for handling a roll of strip material, said machine comprising:

A Housing:

means for supporting a roll of strip material relative to said housing;

a takeup mechanism supported by said housing for receiving and storing strip material;

means substantially enclosing said takeup mechanism;

means carried by said housing for transporting said strip material from said supporting means to said mechanism;

means defining a substantially enclosed passage between said transporting means and said takeup mechanism through which said strip material may be advanced from said transporting means to said takeup mechanism;

means defining an aperture in said passage whereby strip material may be driven by said transporting means to the exterior of said passage through said aperture in the event of malfunction of said takeup mechanism or blockage in said passage between said aperture and said takeup mechanism;

a door positionable across said aperture; and means mounting said door for movement away from said aperture in response to pressure exerted against the door by said strip material.

5. In a motion-picture projector having a projection station, means defining a substantially enclosed takeup chamber, a substantially enclosed guiding channel for film between said projection station and said takeup chamber, means for advancing a strip of film from said projection station to said takeup chamber through said channel, and means located within said enclosed takeup chamber for receiving and winding a filmstrip advanced thereto by said film-advancing means, the improvement comprising:

means defining an aperture in said channel through which said filmstrip may be driven by said advancing means in the event of a malfunction of said receiving and winding means or blockage in said channel between said aperture and said chamber;

a door;

means mounting said door for movement with respect to said means defining said aperture whereby said aperture may be opened and closed; and means biasing said door toward a position closing said aperture.

6. In a motion-picture projector having a projection station, means defining a substantially enclosed film takeup chamber, a plurality of guide members defining opposed portions of a substantially enclosed guiding channel having at least one bend therein for guiding film between said projection station and said takeup chamber, means for advancing a strip of film from said projection station to said takeup chamber through said channel, and means located within said enclosed takeup chamber for receiving and winding a filmstrip advanced thereto by said film-advancing means, the improvement comprising:

means in one of said guide members for defining an aperture in said one guide member through which said strip of film may be driven by said advancing means in the event of a malfunction of said receiving and winding means or blockage in said channel between said aperture and said chamber, the portion of said aperture-defining means most remote from said film-advancing means being spaced from the other of said guide members by a distance greater than the spacing of the portion of said aperture-defining means nearest said film-advancing means, and said aperture-defining means being closely adjacent said bend and being between said bend and said film-advancing means.